Figure 1:
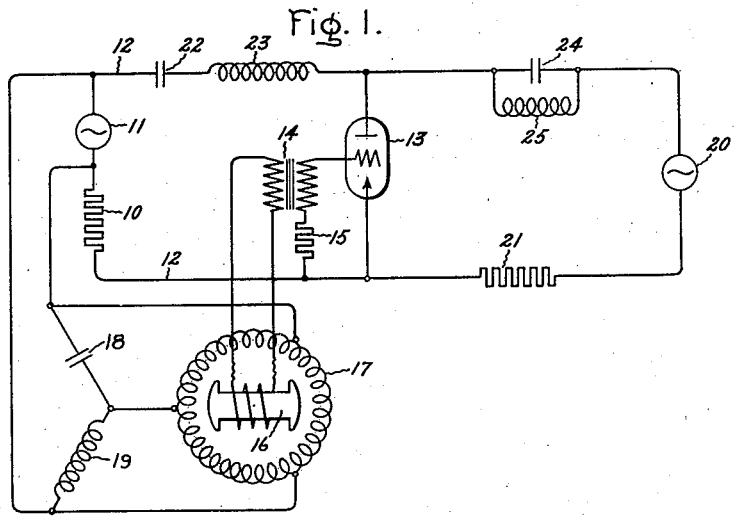

Inventor:
Aram Boyajian,
by Charles N. Tuller
His Attorney.

Patented July 5, 1932

1,866,343

UNITED STATES PATENT OFFICE

ARAM BOYAJIAN, OF PITTSFIELD, MASSACHUSETTS, ASSIGNOR TO GENERAL ELECTRIC COMPANY, A CORPORATION OF NEW YORK

ELECTRIC VALVE CIRCUITS

Application filed December 24, 1930. Serial No. 504,631.

My invention relates to electric valve circuits and more particularly to such circuits including valves of the type provided with an anode, a cathode and a control grid, in which the grid normally loses control after current has once started in the valve.

Heretofore, various circuits have been devised utilizing electric valves of the discontinuous control type, such, for example, as vapor electric discharge valves, which are particularly advantageous for many applications because of the large amounts of power that they can handle at ordinary operating voltages. By the term discontinuous control electric valves, I refer to that type of valve provided with an anode, a cathode, and a control grid, in which the starting of current through the valve is determined by the potential upon the control grid, but in which a current flowing through the valve may be interrupted only by reducing its anode potential below the critical value, that is, in which the grid loses control of the conductivity of the valve when current once has been initiated in it. It often becomes desirable to be able to interrupt the current flowing in the valves at some time other than that at which the anode potential is reduced below the critical value which, for a valve of this type, may be of the order of magnitude of 10 or 15 volts. For example, in the use of such valves in alternating current circuits, it frequently becomes desirable to interrupt the current flowing in the valves at any predetermined point in the cycle of the alternating potential which is applied to the anodes.

It is an object of my invention, therefore, to provide an electric circuit including a discontinuous control electric valve which will have the above-mentioned characteristics, and which will be simple and flexible in operation.

It is a further object of my invention to provide an alternating current circuit including a discontinuous control electric valve in which the current through the valve may be interrupted at any predetermined point in the cycle of alternating potential applied to the anode of the valve.

In accordance with my invention, I connect the alternating current circuit to be controlled in series with the anode and cathode of a discontinuous control electric valve. The anode and cathode of the valve are also connected in series with a second alternating current circuit, the current in the second circuit having an amplitude substantially equal to or greater than that of the current flowing in the first circuit, and having a frequency which is preferably several times that of the first circuit. A filter circuit is connected in series with each of the alternating current circuits to prevent the flow of current of one frequency in the circuit of the other frequency. With this arrangement, the current flowing through the valve is periodically reduced to substantially zero at the higher frequency, the instantaneous energy required by the low frequency circuit flowing, during this short interval, through the high frequency circuit. Any well known means may be provided for controlling the excitation of the control grid to interrupt the current flowing in the low frequency circuit at any desired instant, as, for example, by providing a phase shifting scheme for controlling the phase of the grid potential with respect to the anode potential.

For a better understanding of my invention, together with other and further objects thereof, reference is had to the following description taken in connection with the accompanying drawing and its scope will be pointed out in the appended claims. Fig. 1 of the accompanying drawing illustrates my invention as applied to an arrangement for interrupting the flow of current in an alternating current circuit at any point in the cycle, while Fig. 2 shows certain diagrams to aid in the understanding of my invention.

Referring to Fig. 1 of the accompanying drawing, I have illustrated an arrangement for controlling the current supplied to a load device 10 from a source of alternating current 11 through the circuit 12. This arrangement includes a discontinuous control electric valve 13, whose anode and cathode are connected in series with the circuit 12. The valve 13 is provided with a grid circuit which includes the secondary winding of a grid transformer 14 and a current limiting resistor 15. The primary winding of the grid transformer 14 may be energized from any suitable source of alternating potential variable in phase, such, for example, as the secondary member 16 of a rotary phase shifting arrangement 17 which is energized directly from the alternating current source 11 through a phase splitting circuit comprising a capacitor 18 and reactor 19. In order to periodically reduce the valve current to substantially zero so that the grid may regain control, the anode-cathode circuit of the valve 13 is also connected in series with a source of alternating current 20, which preferably has a frequency several times that of the alternating current source 11. A resistor 21 is included in this circuit in order to limit current flowing through the valve. A filter comprising capacitor 22 and reactor 23 is connected in the alternating current circuit 12 in order to substantially suppress current of any frequency other than that of the alternating current source 11, while a filter comprising capacitor 24 and reactor 25 is connected in the circuit of the higher frequency source 20 in order to suppress the lower frequency current from the circuit 12.

Figure 2:
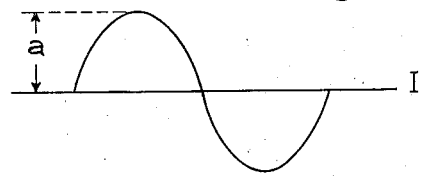
Figure 2:
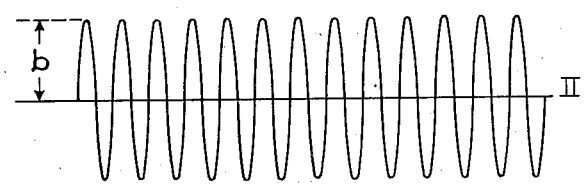
Figure 2:
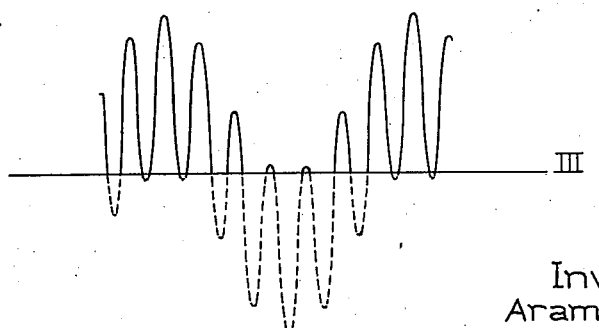

The operation of the above-described apparatus will be more clearly understood by reference to Fig. 2 in which curve I represents the alternating current which would normally flow in the circuit 12 if the valve 13 were short-circuited, curve II represents the alternating current which would be delivered by the source 20 and would normally flow in the circuit were the electric valve 13 short-circuited, and curve III represents the resultant of curves I and II. The solid portion of the curve above the axis represents the current which actually flows in the valve, while the dotted portion of the curve below the axis represents the current which would flow except for the unilateral conductivity of the valve 13. Obviously this dotted portion of the current may also be passed through the circuit 12 by connecting another valve in parallel to the valve 13, but with its anode and cathode reversed. The amplitude $b$ of the current represented by curve II is somewhat greater than the amplitude $a$ of the current represented in curve I so that the resultant of these two currents periodically passes through zero at the frequency of the source 20. However, in some cases, the grid of the valve 13 may be able to regain control of the current in the valve when it is reduced to some small value greater than zero, in which case it is only necessary that the resultant current represented by curve III periodically be reduced below this critical value. By properly adjusting the phase of the potential derived from the rotary phase shifting device 17, it will be well understood by those skilled in the art that the current flowing through the valve may be interrupted at any point in the cycle of the current represented in curve III at which the valve current passes through zero. Hence, the accuracy with which the point, at which current is interrupted, may be controlled, increases directly with an increase in the frequency of the current supplied by the alternating current source 20. It will be apparent that the filter circuits 22, 23 and 24, 25 suppress the high frequency current from the low frequency circuit, and the low frequency current from the high frequency circuit respectively, although whenever the resultant valve current is less than that flowing in the circuit 12, the instantaneous energy furnished to the load device 10 will flow through the high frequency circuit. In some cases it may be permissible to omit one or both of these filter circuits.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a discontinuous control electric valve included in said circuit, and means for establishing control of said valve at any predetermined instant within a conducting half cycle of said alternating current comprising a source of periodic current in circuit with said valve, the frequency of said periodic current being substantially greater than that of said alternating current circuit.

2. In combination, a discontinuous control electric valve provided with an anode, a cathode and a control grid, a circuit including a source of alternating current and the anode-cathode circuit of said valve, and means for enabling the control grid to regain control of the valve current at any predetermined instant within a half cycle of said alternating current comprising a second circuit also including said anode-cathode circuit and a source of alternating current having a frequency substantially greater than that of said first circuit.

3. In combination, a discontinuous control electric valve provided with an anode, a cathode and a control grid, a circuit including a source of alternating current and the anode-cathode circuit of said valve, and means for enabling the control grid to regain control of the valve current at any predetermined instant within a half cycle of said alternating current comprising a second circuit also including said anode-cathode circuit, and a source of alternating current having a frequency substantially greater than that of said first circuit, and an amplitude such that the resultant current flowing in the two circuits periodically falls below the critical value of the valve.

4. In combination, a discontinuous control electric valve provided with an anode, a cathode, and a control grid, a circuit including a source of alternating current and the anode-cathode circuit of said valve, and means for enabling the control grid to regain control of the valve current at any predetermined instant within a half cycle of said alternating current comprising a second circuit also including said anode-cathode circuit and a source of alternating current having a frequency and amplitude greater than the frequency and amplitude, respectively, of the current of said first circuit.

5. In combination, an alternating current circuit, a discontinuous control electric valve included in said circuit, means for establishing control of said valve at any predetermined instant within a conducting half cycle of said alternating current comprising a source of periodic current in circuit with said valve, the frequency of said periodic current being substantially greater than that of said alternating current circuit, and means for preventing the flow of current of one frequency in the circuit of the other frequency.

6. In combination, a discontinuous control electric valve provided with an anode, a cathode, and a control grid, a circuit including a source of alternating current and the anode-cathode circuit of said valve, a second circuit also including the anode-cathode circuit of said valve and a source of alternating current having a frequency and amplitude substantially greater than the frequency and amplitude, respectively, of the current of said first circuit, a filter circuit included in each of said alternating current circuits to substantially suppress the flow of any current therein of the frequency of the other circuit, and a circuit for exciting said control grid.

In witness whereof, I have hereunto set my hand this 18th day of December, 1930.

ARAM BOYAJIAN.